(12) United States Patent
Tang (10) Patent No.: US 11,044,330 B2
(45) Date of Patent: Jun. 22, 2021

(54) METHOD, DEVICE, TERMINAL EQUIPMENT AND SYSTEM FOR MONITORING USER'S ACCESS BEHAVIOR

(71) Applicant: BEIJING GRIDSUM TECHNOLOGY CO., LTD., Beijing (CN)

(72) Inventor: Tianyi Tang, Beijing (CN)

(73) Assignee: Beijing Gridsum Technology Co., Ltd., Beijing (CN)

(*) Notice: Subject to any disclaimer, the term of this patent is extended or adjusted under 35 U.S.C. 154(b) by 423 days.

(21) Appl. No.: 15/756,974

(22) PCT Filed: Sep. 1, 2016

(86) PCT No.: PCT/CN2016/000505
§ 371 (c)(1),
(2) Date: Aug. 4, 2018

(87) PCT Pub. No.: WO2017/036059
PCT Pub. Date: Mar. 9, 2017

(65) Prior Publication Data
US 2018/0332125 A1 Nov. 15, 2018

(30) Foreign Application Priority Data

Sep. 1, 2015 (CN) .......................... 201510551837.X (51) Int. Cl.
*H04L 29/08* (2006.01)
*G06K 7/14* (2006.01)
*G06K 19/06* (2006.01)

(52) U.S. Cl.
CPC ............ *H04L 67/22* (2013.01); *G06K 7/1417* (2013.01); *G06K 19/06037* (2013.01); *H04L 67/146* (2013.01); *H04L 67/02* (2013.01)

(58) Field of Classification Search
CPC ............ G06K 7/1417; G06K 19/06037; H04L 67/22; H04L 67/146; H04L 67/02
See application file for complete search history.

(56) References Cited

U.S. PATENT DOCUMENTS

| 5,835,724 A | * | 11/1998 | Smith | ..................... H04L 29/06 709/227 |
| 8,256,664 B1 | * | 9/2012 | Balfanz | ................... G06F 21/43 235/375 |

(Continued)

FOREIGN PATENT DOCUMENTS

| CN | 1492656 A | 4/2004 |
| CN | 1878170 A | 12/2006 |

(Continued)

*Primary Examiner* — Moustafa M Meky
*Assistant Examiner* — Kidest Mendaye
(74) *Attorney, Agent, or Firm* — Gang Yu (57) ABSTRACT

The present invention discloses a method, device, terminal equipment and system for monitoring user's access behavior, relates to the Internet technical field, and has the main object to solve the problem that depending on the user unique ID, a sever will be caused to monitor the same session separately when different session IDs of different terminal equipment are associated by the sever. The main technical solution of the present invention comprises: a second terminal equipment acquires a first session ID and a URL of the target landing page when a first terminal equipment is switched to the second terminal equipment to carry on accessing the same website; the second terminal equipment jumps according to the URL of the target landing page, and replaces the second session ID with the first session ID; the second terminal equipment sends the first session ID to a server, so that the server can monitor user's access behavior based on the first session ID. The present (Continued)

invention is generally applied to the process of monitoring by the server the user's access behavior across the equipment.

16 Claims, 3 Drawing Sheets

(56) References Cited

U.S. PATENT DOCUMENTS

| | | | |
|---|---|---|---|
| 8,817,959 B1* | 8/2014 | O'Hanlon | H04M 3/5166 379/93.24 |
| 9,628,445 B2* | 4/2017 | Antonakakis | H04L 63/123 |
| 9,749,143 B2* | 8/2017 | Gao | G06F 17/00 |
| 9,794,321 B2* | 10/2017 | Trifa | H04L 67/327 |
| 2011/0270751 A1* | 11/2011 | Csinger | G06F 21/40 705/42 |
| 2012/0084349 A1* | 4/2012 | Lee | G06Q 30/0251 709/203 |
| 2012/0323717 A1* | 12/2012 | Kirsch | G06F 21/31 705/26.1 |
| 2014/0088983 A1* | 3/2014 | Neff | G06Q 50/22 705/2 |
| 2014/0280981 A1* | 9/2014 | Singhal | H04L 67/141 709/227 |
| 2015/0213529 A1* | 7/2015 | Moshal | G06K 7/1417 705/51 |
| 2015/0244539 A1* | 8/2015 | Ickman | H04N 21/4788 709/204 |
| 2018/0144332 A1* | 5/2018 | Shauh | G06Q 20/325 |

FOREIGN PATENT DOCUMENTS

| | | |
|---|---|---|
| CN | 102177526 A | 9/2011 |
| CN | 103685304 A | 3/2014 |
| CN | 104092811 A | 10/2014 |
| CN | 104376090 A | 2/2015 |
| WO | 2014190789 A1 | 12/2014 |

* cited by examiner

METHOD, DEVICE, TERMINAL EQUIPMENT AND SYSTEM FOR MONITORING USER'S ACCESS BEHAVIOR

This application is a U.S. national phase application under 37 U.S.C. § 371 of International Application No. PCT/CN2016/000505 filed on Sep. 1, 2016, which is based upon and claims priority to Chinese Patent Application No. 201510551837.X, filed on Sep. 1, 2015. The entire contents of each of PCT/CN2016/000505 and CN Application No. 201510551837.X are incorporated herein by reference.

FIELD OF THE INVENTION

The present invention relates to Internet technical field, and more particularly, to a method, device, terminal equipment and system for monitoring user's access behavior.

BACKGROUND OF THE INVENTION

In order to monitor user's access behavior, when the user sends a request information to a server for accessing a website based on a terminal equipment, the server creates a session and generates a unique session ID associated with the session, the server responses to the request information of the terminal equipment with the session ID, which is stored in a local cookie of the terminal equipment. Since the terminal equipment will always carry the cookie containing the session ID each time it sending the request information to the server, the server monitors the user's access behavior based on the session ID.

There exist situations, where a terminal equipment A is first used by the user to access the website, and then a terminal equipment B is used to scan a QR code displayed on the terminal equipment A during the accessing, and jumps to the website accessed by the user with the terminal equipment A to carry on accessing the website. Since the terminal equipment are different, the sessions created by the server are also different, that is, the session IDs are different, resulting in that the same session created by the same user contains two different session IDs and the two different session IDs have no association between them, thus the server will monitor different users' access behavior for different session IDs, which will cause the server to monitor the same session separately.

In order to solve the problems described above, technical solutions are taken as follows: when a terminal equipment A is used to send a request information carrying a session ID to a server for accessing a website, the user registers with the website, and uses an account registered to log on the website, a user unique ID is generated and the session ID and the user unique ID are sent to the server; when a terminal equipment B is used by the user to send a request information carrying a session ID for accessing the website, the account registered is used to log on the website to generate a user unique ID, and the session ID and the user unique ID are sent to the server; the server determines that the user unique ID corresponds to two different session IDs, and associates the two different session IDs with each other, so as to solve the problem of the server monitoring the same session separately.

In implementation of the technical solutions described above, the inventor discovers that there exists a problem as follows: since some websites can still be accessed without the user registering and logging, if either or both of the terminal equipment A and terminal equipment B haven't logged on the website, then the server cannot acquire the user unique ID in the terminal equipment A and/or terminal equipment B. Thus the server cannot associate the session ID in the terminal equipment A with the session ID in the terminal equipment B, so as to cause the server to monitor the same session separately.

SUMMARY OF THE INVENTION

In this context, the present invention provides a method, device, terminal equipment and system for monitoring user's access behavior, with the main object to solve the problem that depending on the user unique ID, a sever will be caused to monitor the same session separately when different session IDs of different terminal equipment are associated by the sever.

In order to solve the problem described above, the present invention generally provides the following technical solutions:

In one aspect, the invention provides a method for monitoring user's access behavior, the method comprising:

acquiring a first session ID and a uniform resource locator (URL) of the target landing page by the second terminal equipment when a first terminal equipment is switched to a second terminal equipment to carry on accessing the same website; wherein the first session ID is a session ID generated by a server while the website is accessed by the first terminal equipment, the first session ID is sent to the server by the first terminal equipment;

jumping according to the URL of the target landing page by the second terminal equipment, and replacing a second session ID with the first session ID, wherein the second session ID is a session ID generated by the server while the website is accessed by the second terminal equipment;

sending the first session ID by the second terminal equipment to the server, so that the server can monitor the user's access behavior based on the first session ID.

In another aspect, the invention further provides a device for monitoring user's access behavior, the device comprising:

an acquiring unit for acquiring a first session ID and a URL of the target landing page by the second terminal equipment when a first terminal equipment is switched to a second terminal equipment to carry on accessing the same website; wherein the first session ID is a session ID generated by a server while the website is accessed by the first terminal equipment, the first session ID is sent to the server by the first terminal equipment;

a processing unit for jumping according to the URL of the target landing page, and replacing a second session ID with the first session ID, wherein the second session ID is a session ID generated by the server while the website is accessed by the second terminal equipment;

a sending unit for sending the first session ID replaced by the processing unit to the server, so that the server can monitor the user's access behavior based on the first session ID.

In a third aspect, the present invention further provides a terminal equipment, the terminal equipment comprising the device monitoring the user's access behavior as described above.

In a fourth aspect, the invention further provides a system for monitoring user's access behavior, the system comprising a sever and at least two terminal equipment as described above: first terminal equipment and second terminal equipment;

the first terminal equipment is used for sending a first session ID, generated by the server when a website is accessed, to the server while the user is accessing the website;

the server is used for receiving and storing the first session ID sent by the first terminal equipment;

the second terminal equipment is used for acquiring the first session ID and a URL of the target landing page when carrying on accessing the same website accessed by the first terminal equipment, jumping according to the URL of the target landing page, and replacing a second session ID with the first session ID and sending the first session ID to the server, sending the first session ID to the server;

the server is also used for receiving and storing the first session ID sent by the second terminal equipment, and monitoring the user's access behavior based on the first session ID.

By means of the technical solutions described above, the present invention provides the technical solutions at least with the following advantages:

The present invention provides a method, device, terminal equipment and system for monitoring user's access behavior, that during the user's accessing to a website, when a first terminal equipment is switched to a second terminal equipment to carry on accessing the website, the second terminal equipment acquires a first session ID and a URL of the target landing page, the second terminal equipment jumps according to the URL of the target landing page, and replaces a second session ID with the first session ID and sends the first session ID to the server, wherein the first session ID is a session ID generated by the server while the website is accessed by the first terminal equipment. Compared with the prior art, in the present invention, when the first terminal equipment is switched to a second terminal equipment to carry on accessing the website, the session ID of the second terminal equipment is replaced with the session ID of the first terminal equipment, different terminal equipment use the same session ID while accessing the website, and the same session ID is based on by the server to monitor the same session.

The description described above is merely the summary of the technical solutions of the invention, for the purpose that the technical means of the invention will be more fully understood and carried out with reference to the description, and for the foregoing as well as other objects, features and advantages to be more apparent, specific embodiments will be presented as follows.

BRIEF DESCRIPTION OF THE DRAWINGS

Numerous additional advantages and benefits will become apparent to those of ordinary skill in the art upon reading the following detailed description of the preferred embodiments. The drawings are only for the purpose of illustrating preferred embodiments and are not to be construed as limiting the invention. Moreover, like reference numerals refer to like parts throughout the drawings, in which.

DETAILED DESCRIPTION

Exemplary embodiments of the present disclosure will now be described in more detail with reference to the accompanying drawings. Although exemplary embodiments of the present disclosure are shown in the drawings, it is to be understood that the present disclosure can be carried out in various forms and should not be limited by the embodiments set forth herein. Rather, these embodiments are provided so that this disclosure will be thoroughly understood, and will fully convey the scope of the present disclosure to those skilled in the art.

Figure 1:
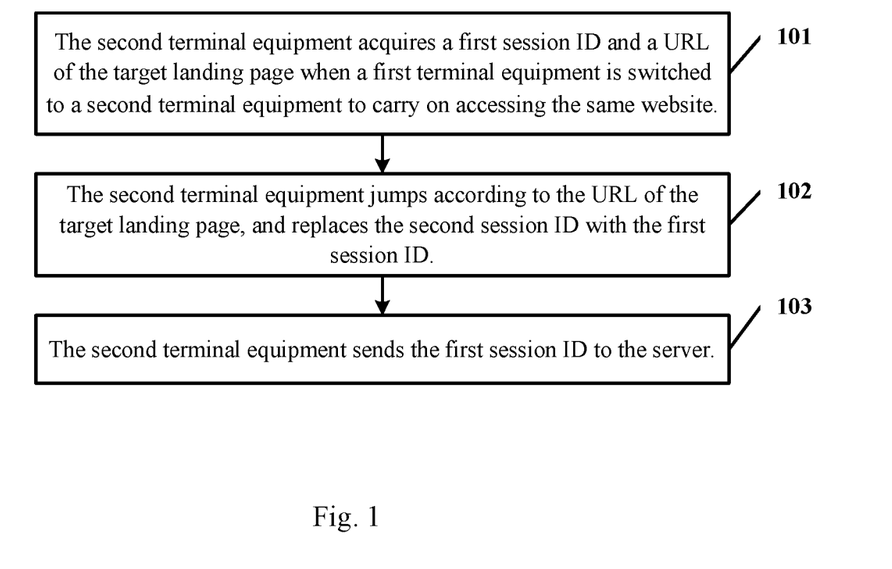
FIG. 1 illustrates a flowchart of a method for monitoring user's access behavior according to an embodiment of the present invention.

An embodiment of the present invention provides a method for monitoring user's access behavior as described in FIG. 1, the method comprising:

101. A second terminal equipment acquires a first session ID and a URL of the target landing page when a first terminal equipment is switched to the second terminal equipment to carry on accessing the same website.

When the first terminal equipment is used by the user to access the website for the first time, it needs to send a request information for accessing the website to a server, then the server creates a session after receiving the request information and generates an unique first session ID associated with the session, which is stored in the memory of the server to track each user; the first session ID stored in the memory of the server is used to distinguish different sessions, and to monitor user's access behavior respectively based on different session IDs during the monitoring of the user's access behavior by the server. The server will send the first session ID to the first terminal equipment in response to the request information of the first terminal equipment, and the first terminal equipment stores the first session ID in a local cookie. The first terminal equipment sends the first session ID stored in the cookie to the server each time it sends the request information for accessing the website to the server, and the server compared the received session ID with various session IDs stored in the server, thus to find out the corresponding session ID of the user to operate. Wherein the cookie is generated by a preset script in the website or a browser of the first terminal equipment, the browser will save the cookie in a text file under a preset catalogue, when the browser installed in the first terminal equipment is set to initiate the cookie, the first terminal equipment will send the first session ID stored in the cookie to the server each time it sends the request information for accessing the website to the server.

During the accessing to the website by the user, the second terminal equipment acquires the first session ID and the URL of the target landing page when the first terminal equipment is switched to the second terminal equipment by the user to carry on accessing the same website during. In an implementation of the embodiments of the present invention, the first session ID acquired by the second terminal equipment and the URL of the target landing page are independent of each other, and the second terminal equipment needs to acquire the first session ID and the URL of the target landing page separately; In another implementation of the embodiments of the present invention, when the first session ID and the URL of the target landing page are acquired by the second terminal equipment, the first session ID is attached to the URL of the target landing page. The specific form of the first session ID and the URL of the target landing page will not be limited by the embodiments of the present invention.

It should be noted that a session has a life cycle, and if the cookie is prohibited by the browser of the first terminal equipment, the life cycle of the session is the time interval between the user entering the website and the user closing the browser installed on the first terminal equipment, and when the life cycle of the session is exceeded the session will be cleared by the server, that is the server will create a new session when the browser installed on the first terminal equipment is reopened by the user to access the website. If the cookie is initiated by the browser of the first terminal equipment, the life cycle of the session is the same as that of the cookie, that is during the life cycle of the session, even if the browser of the first terminal equipment is closed by the user, the request information for accessing the website will carry the first session ID corresponding to the session generated earlier by the server each time it is sent by the first terminal equipment to the server. Wherein an Expire value will be set when the cookie is generated, and the Expire value is the life cycle of the cookie, the setting of which will not be specifically defined in the embodiments of the present invention.

In the embodiments of the present invention, the first terminal equipment and second terminal equipment may comprise, but are not limited to, personal computer, laptop, tablet, smartphone, etc.; the browsers used in the first terminal equipment and the second terminal equipment may comprise, but are not limited to the following types of browser, such as IE kernel browser, Webkit kernel browser, Firefox kernel browser etc., the specific type of the first terminal equipment, the second terminal equipment and the browser will not be defined in the embodiments of the present invention.

102. The second terminal equipment jumps according to the URL of the target landing page, and replaces the second session ID with the first session ID.

It is to be noted that, when the second terminal equipment jumps based on the URL of the target landing page, it will not be involved with the interaction between the second terminal equipment and the sever, and the second terminal equipment will replace the second session ID with the first session ID after it has jumped to the target landing page. Wherein, the second session ID is a session ID generated by the server while the website is accessed by the second terminal equipment.

Based on the first session ID and the URL of the target landing page acquired in step 101 as well as the first session ID being attached to the URL of the target landing page, when the second terminal equipment jumps according to the URL of the target landing page, it resolves the URL of the target landing page and acquires the corresponding value of the first session ID in the URL of the target landing page, based upon which the second terminal equipment replaces the corresponding value of the second session ID of itself. As an exemplary illustration, the URL of the target landing page acquired by the second terminal equipment is: http://www.ABC.com/?sessionID=123456, which will be based on to jump and be resolved by the preset script in the second terminal equipment to acquire 123456 as the first session ID, and the second terminal equipment will replace the corresponding value of the second session ID with the corresponding value 123456 of the first session ID, thus the second terminal equipment has accomplished replacing the second session ID with the first session ID.

103. The second terminal equipment sends the first session ID to the server.

Each time the second terminal equipment sends the request information for accessing the website to the sever, it will send the first session ID stored in the cookie to the server, and the server monitors user's access behavior based on the first session ID.

An embodiment of the present invention provides a method for monitoring user's access behavior that, during the user's accessing to a website, when a first terminal equipment is switched to a second terminal equipment to carry on accessing the website, the second terminal equipment acquires a first session ID and a URL of the target landing page, the second terminal equipment jumps according to the URL of the target landing page, and replaces a second session ID with the first session ID and sends the first session ID to the server, wherein the first session ID is a session ID generated by the server while the website is accessed by the first terminal equipment; compared with the prior art, in the present invention, when the first terminal equipment is switched to a second terminal equipment to carry on accessing the website, the session ID of the second terminal equipment is replaced with the session ID of the first terminal equipment, different terminal equipment use the same session ID while accessing the website, and the same session ID is based on by the server to monitor the same session.

Further, as an refinement and extension of the embodiments described above, in the step 102 as above, when the second terminal equipment acquires the first session ID and the URL of the target landing page, it can be employed, but not limited to as follows:

Mode one: The second terminal equipment acquires the first session ID and the URL of the target landing page by scanning and acquiring the QR code in the first terminal equipment.

When the user switches the first terminal equipment to the second terminal equipment to carry on accessing the website, the second terminal equipment scans the QR code in the first terminal equipment, which comprises the first session ID and the URL of the target landing page, and the second terminal equipment resolves the acquired QR code to acquire the first session ID and the URL of the target landing page, when the second terminal equipment scans the QR code in the first terminal equipment, a scanner included in the second terminal equipment or a scanning application installed in the second terminal equipment is used to scan the QR code in the first terminal equipment, and the devices used by the second terminal equipment to scan the QR code in the first terminal equipment will not be limited by the embodiments of the present invention.

As an implementation of the embodiments of the present invention, the first terminal equipment sends the first session ID and the URL of the target landing page as a parameter to a third party programmed interface to generate a request information for the QR code, when the third party programmed interface receives the request information, it calls preset function, which uses the first session ID and the URL of the target landing page as a parameter, to generate the QR code, and the generated QR code is sent by the third party programmed interface to the first terminal equipment, and the QR code generated by the third party programmed interface will attach the first session ID to the URL of the target landing page, so that the second terminal equipment can quickly acquire the first session ID when it scans the QR code and jumps according to the URL of the target landing page.

It is to be noted that, the third party programmed interface is a server end programmed interface as well as a programmed interface that can receive request information of a fixed format and can response to that request information, which generally uses JavaScript Object Notation (JSON) or Extensible Markup Language (XML) as a media. The third party programmed interface is different from the corresponding server of the request information for accessing the website sent by the first terminal equipment or the second terminal equipment, when the first terminal equipment sends the request information to the third party programmed interface, the request information will be identified, so that it can be distinguished from the request information for accessing the website sent by the first terminal equipment, and when the request information sent by the first terminal equipment is to be identified, any implementation of prior art can be employed and will not be described again in the embodiments of the present invention.

As another implementation of the embodiments of the present invention, the first terminal equipment generates the QR code based on an installed application for generating QR codes, the application uses the first session ID and the URL of the target landing page as a parameter while it is generating the QR code, and the specific types of the application for generating QR codes will not be limited in the embodiments of the present invention.

Mode two: The second terminal equipment acquires the first session ID and the URL of the target landing page based on the wireless or wired transmission between the first terminal equipment and the second terminal equipment.

In an implementation of the embodiments of the present invention, before the second terminal equipment acquiring the first session ID and the URL of the target landing page, it can utilize various ways, such as Bluetooth, wireless transmission software, etc., to establish wireless communication with the first terminal equipment, so as to acquire the first session ID and the URL of the target landing page. As an exemplary illustration, when the first terminal equipment is a smartphone and the second terminal equipment is a tablet, Bluetooth of the smartphone is opened as well as the tablet, then the smartphone can be paired with the tablet, and after successfully pairing, the smartphone acquires the first session ID and the URL of the target landing page, and sends the first session ID and the URL of the target landing page to the tablet.

In another implementation of the embodiments of the present invention, when the second terminal equipment acquires the first session ID and the URL of the target landing page, it establishes wired communication with the first terminal equipment, so as to acquire the first session ID and the URL of the target landing page. As an exemplary illustration, when the first terminal equipment is a PC and the second terminal equipment is a smart phone, wired communication between the PC and the smartphone can be established via Universal Serial Bus(USB), and the PC sends the first session ID and the URL of the target landing page to the smartphone. The specific types of equipment of the first terminal equipment, the second terminal equipment and the way of wireless transmission and wired transmission will not be limited in the embodiments of the present invention.

Figure 2:
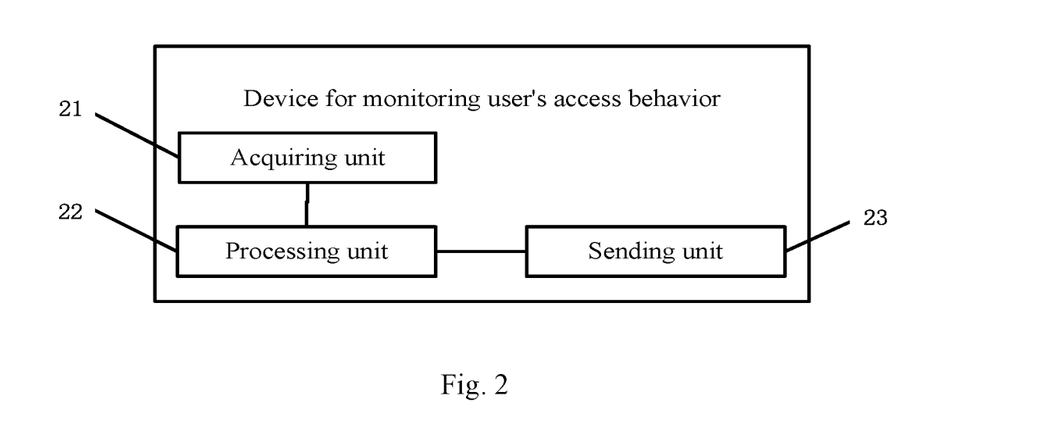
FIG. 2 illustrates a composition block diagram of a device for monitoring user's access behavior according to an embodiment of the present invention.

Further, as an implementation of the method described above, an embodiment of the present invention provides a device for monitoring user's access behavior, as shown in FIG. 2, the device comprises:

an acquiring unit 21 for a second terminal equipment to acquire a first session ID and a URL of the target landing page when a first terminal equipment is switched to the second terminal equipment to carry on accessing the same website; wherein the first session ID is a session ID generated by a server while the website is accessed by the first terminal equipment, the first session ID is sent to the server by the first terminal equipment;

a processing unit 22 for jumping according to the URL of the target landing page acquired by the acquiring unit 21, and to replace a second session ID with the first session ID, wherein the second session ID is a session ID generated by the server while the website is accessed by the second terminal equipment;

a sending unit 23 for sending the first session ID replaced by the processing unit 22 to the server, so that the server can monitor the user's access behavior based on the first session ID.

Figure 3:
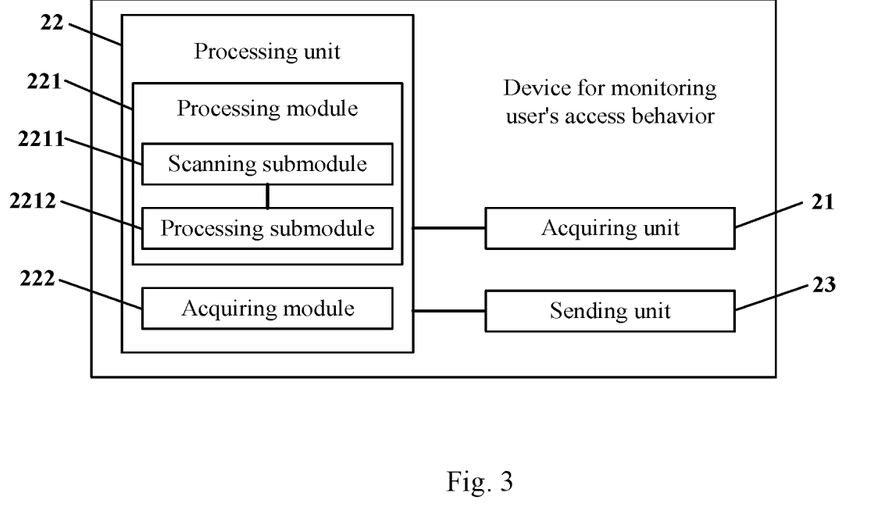
FIG. 3 illustrates another composition block diagram of a device for monitoring user's access behavior according to an embodiment of the present invention.

Further, as shown in FIG. 3, the processing unit 22 comprises:

a processing module 221 for scanning a QR code in the first terminal equipment to acquire the first session ID and the URL of the target landing page, the QR code comprises the information about the first session ID and the URL of the target landing page;

an acquiring module 222 for acquiring the first session ID and the URL of the target landing page based on the wireless or wired transmission between the first terminal equipment and the second terminal equipment.

Further, as shown in FIG. 3, the processing module 221 comprises:

a scanning submodule 2211 for scanning the QR code in the first terminal equipment;

a processing submodule 2212 for resolving the QR code scanned by the scanning submodule 2211 to acquire the first session ID and the URL of the target landing page. Further, the QR code processed by the processing module is generated by a third party programmed interface based on the first session ID sent by the first terminal equipment and the URL of the target landing page.

Further, an embodiment of the present invention also provides a terminal equipment, which comprises the device for monitoring user's access behavior as shown in either FIG. 2 or FIG. 3.

Figure 4:
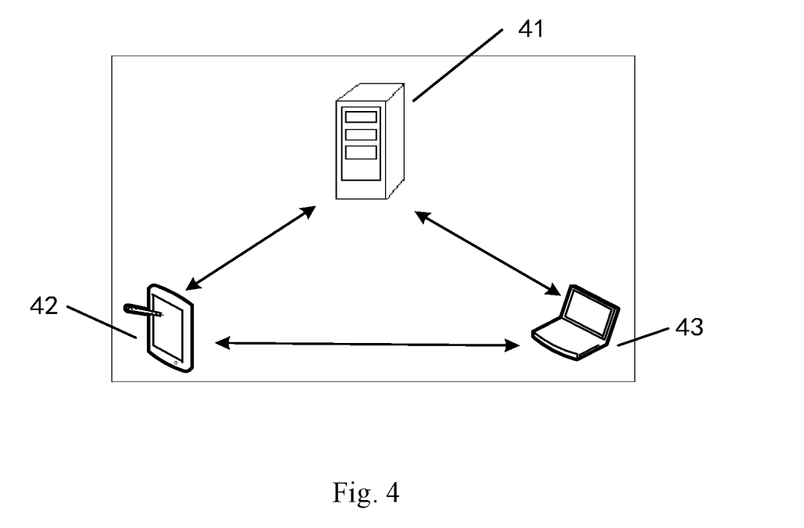
FIG. 4 illustrates a composition block diagram of a system for monitoring user's access behavior according to an embodiment of the present invention.

Further, an embodiment of the present invention also provides a system for monitoring user's access behavior, as shown in FIG. 4, the system comprising: server 41 and at least two terminal equipment as shown in either of the FIG. 2, FIG. 3, a first terminal equipment 42, a second terminal equipment 43;

the first terminal equipment 42 is used for sending a first session ID to the server 41, and the first session ID is a session ID generated by the server 41 when a website is accessed;

the server 41 is used for receiving and storing the first session ID sent by the first terminal equipment 42;

the second terminal equipment 43 is used for acquiring the first session ID and a URL of the target landing page when carrying on accessing the same website accessed by the first terminal equipment 42, jumping according to the URL of the target landing page, and replacing a second session ID with the first session ID and sending the first session ID to the server 41, sending the first session ID to the server 41;

the server 41 is also used for receiving and storing the first session ID sent by the second terminal equipment 43, and monitoring the user's access behavior based on the first session ID.

In an embodiment of the present invention, the first terminal equipment shown as in FIG. 4 is a tablet, the second terminal equipment is a PC, the first terminal equipment and the second terminal equipment in FIG. 4 are merely as an exemplary example, and the specific type of the equipment of the first terminal equipment and the second terminal equipment will not be limited in the embodiments of the present invention.

Figure 5:
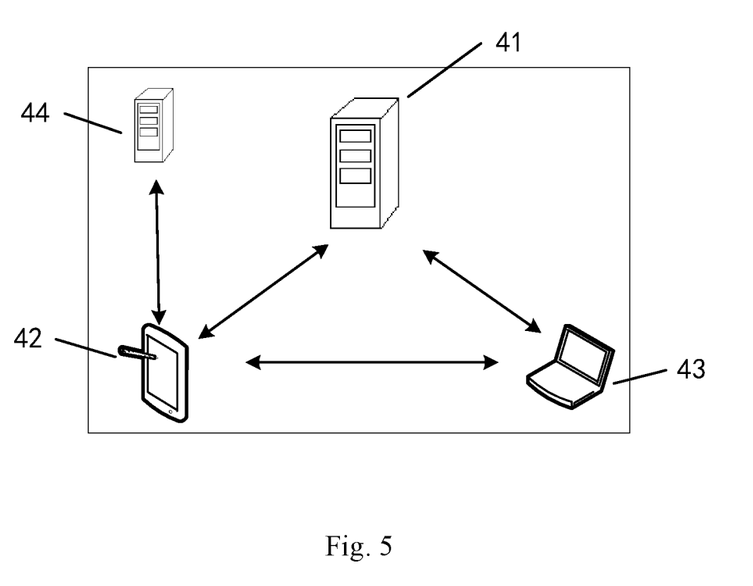
FIG. 5 illustrates another composition block diagram of a system for monitoring user's access behavior according to an embodiment of the present invention.

Further, as shown in FIG. 5, the system also comprises a third party programmed interface 44:

the first terminal equipment 42 is also used for sending the first session ID and the URL of the target landing page to the third party programmed interface 44;

the third party programmed interface 44 is used for receiving the first session ID sent by the first terminal equipment 42 and the URL of the target landing page, using the first session ID and the URL of the target landing page as a parameter to generate a QR code, and sending the QR code to the first terminal equipment 42.

An embodiment of the present invention provides a device, terminal equipment and system for monitoring user's access behavior. During the user's access to a website, when a first terminal equipment is switched to a second terminal equipment to carry on accessing the website, the second terminal equipment acquires a first session ID and a URL of the target landing page, the second terminal equipment jumps according to the URL of the target landing page, and replaces a second session ID with the first session ID and sends the first session ID to a server, wherein the first session ID is a session ID generated by the server while the website is accessed by the first terminal equipment. Compared with the prior art, in the embodiment of the present invention, when the first terminal equipment is switched to a second terminal equipment to carry on accessing the website, the session ID of the second terminal equipment is replaced with the session ID of the first terminal equipment, different terminal equipment use the same session ID while accessing the website, and the same session ID is based on by the server to monitor the same session.

In the embodiments described above, the description of each embodiment is focused on respectively, and parts not described in detail in a certain embodiment can refer to the related description of other embodiments.

It is to be understood that the pertinent features of the method and device described above can be cross referenced. Additionally, the 'first', 'second' and so on in the embodiments above is to distinguish various embodiments, and not to represent whether an embodiment is good or not.

It will be clearly understood by those skilled in the art that, for convenience and brevity, the specific operation process of the system, device and unit as described above can be carried out with reference to the corresponding process in the forgoing embodiments of method, and will not be described herein anymore.

The algorithms and displays presented herein are not inherently related to any particular computer, virtual system or other apparatus. Various general purpose systems may be used with the teachings herein. The desired structure to build such systems will be apparent from the description above. In addition, the present invention is not described with reference to any particular programming language. It should be appreciated that a variety of programming languages may be used to implement the disclosure of the present invention as described herein, and any references to specific languages are provided to disclose the best mode of the present invention.

In the description provided herein, numerous specific details are set forth. It will be understood, however, that the embodiments of the present invention may be practiced without these specific details. In some instances, well-known methods, structures and techniques have not been shown in detail in order not to obscure the understanding of this description.

Similarly, it should be appreciated that in the foregoing description of exemplary embodiments of the present invention, various features of the present invention are sometimes grouped together in a single embodiment, drawings, or description thereof for the purpose of streamlining the disclosure aiding in the understanding of one or more of the various inventive aspects. This method of the disclosure, however, is not to be interpreted as reflecting an intention that the claimed invention requires more features than are expressly recited in each claim. Rather, as the following claims reflect, inventive subject matter lies in less than all features of a single disclosed embodiment. Thus, the claims following the detailed description are hereby expressly incorporated into this detailed description, with each claim standing on its own as a separate embodiment of the present invention.

It will be clearly understood by those skilled in the art that, the modules in the equipment of an embodiment can be varied accordingly and can be configured to be in one or more equipment different from that of the embodiment. The modules or units or components in the embodiments can be combined to one module or unit or component, and they can also be divided to several submodules or subunits or subcomponents. All of the features disclosed in this specification (including any accompanying claims, abstract and drawings), and/or all of the processes or units of any method or equipment so disclosed, may be combined in any combination, except combinations where at least some of such features and/or processes or units are mutually exclusive. Each feature disclosed in the specification, including the claims, abstract, and drawings, can be replaced by alternative features serving the same, equivalent or similar purpose, unless expressly stated otherwise.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Various embodiments of components of the present invention may be implemented in hardware, or as software modules running on one or more processors, or on a combination thereof. Those skilled in the art will appreciate that a microprocessor or digital signal processor (DSP) may be used in practice to implement some or all of the functionality of some or all of the components according to the title of invention of the embodiments of the invention, such as devices to determine the level of links in the website. The present invention may also be embodied as one or more device or apparatus programs (e.g. computer programs and computer program products) for carrying out part or all of any of the methods described herein. Such programs embodying the present invention may be stored on computer-readable media, or could be in the form of one or more signals. Such signals may be available by downloading from an Internet website, or provided on a carrier signal, or be provided in any other form.

It should be noted that the above mentioned embodiments illustrate rather than limit the invention, and that those skilled in the art will be capable of designing alternative embodiments without departing from the scope of the invention as defined by the appended claims. In the claims, any reference signs between parenthesis shall not be construed as limiting the claim. The word 'comprising' not exclude the presence of elements or steps not listed in a claim. The word 'a' or 'an' preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of monitoring user's access behavior, characterized in comprising:
    acquiring a first session ID and a uniform resource locator (URL) of target landing page by a second terminal equipment when a first terminal equipment is switched to the second terminal equipment to carry on accessing same website; wherein the first session ID is a session ID generated by a server while the website is accessed by the first terminal equipment, the first session ID is sent to the server by the first terminal equipment;
    jumping according to the URL of the target landing page by the second terminal equipment, and replacing a second session ID with the first session ID, wherein the second session ID is a session ID generated by the server while the website is accessed by the second terminal equipment;
    sending the first session ID to the server by the second terminal equipment;
    monitoring the user's access behavior by the server based on the first session ID;
    wherein the first terminal equipment is also used for sending the first session ID and the URL of the target landing page to a third party programmed interface;
    the third party programmed interface for receiving the first session ID and the URL of the target landing page sent by the first terminal equipment, using the first session ID and the URL of the target landing page as a parameter to generate a QR code, and sending the QR code to the first terminal equipment;
    wherein acquiring the first session ID and the URL of the target landing page by the second terminal equipment comprises:
    scanning a QR code in the first terminal equipment by the second terminal equipment to acquire the first session ID and the URL of the target landing page, the QR code comprises the information about the first session ID and the URL of the target landing page.

2. The method of claim 1, characterized in that acquiring the first session ID and the URL of the target landing page by the second terminal equipment comprises:
    acquiring the first session ID and the URL of the target landing page by the second terminal equipment based on a wireless or wired transmission between the first terminal equipment and the second terminal equipment.

3. The method of claim 2, characterized in that scanning the QR code in the first terminal equipment by the second terminal equipment to acquire the first session ID and the URL of the target landing page comprises:
    scanning the QR code in the first terminal equipment by the second terminal equipment;
    resolving the QR code by the second terminal equipment to acquire the first session ID and the URL of the target landing page.

4. The method of claim 3, characterized in that the QR code is generated by a third party programmed interface based on the first session ID and the URL of the target landing page sent by the first terminal equipment, or
    the QR code is generated by the first terminal equipment based on the first session ID and the URL of the target landing page.

5. The method of claim 2, characterized in that the QR code is generated by a third party programmed interface based on the first session ID and the URL of the target landing page sent by the first terminal equipment, or
    the QR code is generated by the first terminal equipment based on the first session ID and the URL of the target landing page.

6. A device for monitoring user's access behavior, characterized in comprising: a hardware processor coupled with a memory and configured to execute program units stored on the memory, wherein the program units comprise:
    an acquiring unit for acquiring a first session ID and a URL of the target landing page by a second terminal equipment when a first terminal equipment is switched to the second terminal equipment to carry on accessing the same website; wherein the first session ID is a session ID generated by a server while the website is accessed by the first terminal equipment, the first session ID is sent to the server by the first terminal equipment;
    a processing unit for jumping according to the URL of the target landing page, and replacing a second session ID with the first session ID, wherein the second session ID is a session ID generated by the server while the website is accessed by the second terminal equipment;
    a sending unit for sending the first session ID replaced by the processing unit to the server;
    the device further for monitoring the user's access behavior by the server based on the first session ID;
    the hardware processor is further configured to execute the following programs: the first terminal equipment is also used for sending the first session ID and the URL of the target landing page to a third party programmed interface;
    the third party programmed interface for receiving the first session ID and the URL of the target landing page sent by the first terminal equipment, using the first session ID and the URL of the target landing page as a parameter to generate a QR code, and sending the QR code to the first terminal equipment;
    wherein the processing unit comprising: a processing module for scanning a QR code in the first terminal equipment to acquire the first session ID and the URL of the target landing page, the QR code comprises the information about the first session ID and the URL of the target landing page.

7. The device of claim 6, characterized in that the processing unit comprising:
    an acquiring module for acquiring the first session ID and the URL of the target landing page based on the wireless or wired transmission between the first terminal equipment and the second terminal equipment.

8. The device of claim 7, characterized in that the processing module comprising:
a scanning submodule for scanning the QR code in the first terminal equipment;
a processing submodule for resolving the QR code scanned by the scanning submodule to acquire the first session ID and the URL of the target landing page.

9. A terminal equipment, characterized in comprising the device for monitoring user's access behavior according to the claim 8.

10. A system for monitoring user's access behavior, characterized in that the system comprising a sever and at least two terminal equipment according to the claim 9: a first terminal equipment and a second terminal equipment;
the first terminal equipment for sending a first session ID to the server, wherein the first session ID is a session ID generated by the server when the website is accessed;
the server for receiving and storing the first session ID sent by the first terminal equipment;
the second terminal equipment for acquiring the first session ID and a URL of the target landing page when carrying on accessing the same website accessed by the first terminal equipment, jumping according to the URL of the target landing page, and replacing a second session ID with the first session ID and sending the first session ID to the server, and sending the first session ID to the server, wherein the second session ID is a session ID generated by the server while the website is accessed;
the server is also used for receiving and storing the first session ID sent by the second terminal equipment, and monitoring the user's access behavior based on the first session ID.

11. A terminal equipment, characterized in comprising the device for monitoring user's access behavior according to the claim 7.

12. A system for monitoring user's access behavior, characterized in that the system comprising a sever and at least two terminal equipment according to the claim 11: a first terminal equipment and a second terminal equipment;
the first terminal equipment for sending a first session ID to the server, wherein the first session ID is a session ID generated by the server when the website is accessed;
the server for receiving and storing the first session ID sent by the first terminal equipment;
the second terminal equipment for acquiring the first session ID and a URL of the target landing page when carrying on accessing the same website accessed by the first terminal equipment, jumping according to the URL of the target landing page, and replacing a second session ID with the first session ID and sending the first session ID to the server, and sending the first session ID to the server, wherein the second session ID is a session ID generated by the server while the website is accessed;
the server is also used for receiving and storing the first session ID sent by the second terminal equipment, and monitoring the user's access behavior based on the first session ID.

13. The system of claim 12, characterized in that the system comprising a third party programmed interface:
the first terminal equipment is also used for sending the first session ID and the URL of the target landing page to the third party programmed interface;
the third party programmed interface for receiving the first session ID and the URL of the target landing page sent by the first terminal equipment, using the first session ID and the URL of the target landing page as a parameter to generate a QR code, and sending the QR code to the first terminal equipment.

14. A terminal equipment, characterized in comprising the device for monitoring user's access behavior according to the claim 6.

15. A system for monitoring user's access behavior, characterized in that the system comprising a sever and at least two terminal equipment according to the claim 14: a first terminal equipment and a second terminal equipment;
the first terminal equipment for sending a first session ID to the server, wherein the first session ID is a session ID generated by the server when the website is accessed;
the server for receiving and storing the first session ID sent by the first terminal equipment;
the second terminal equipment for acquiring the first session ID and a URL of the target landing page when carrying on accessing the same website accessed by the first terminal equipment, jumping according to the URL of the target landing page, and replacing a second session ID with the first session ID and sending the first session ID to the server, and sending the first session ID to the server, wherein the second session ID is a session ID generated by the server while the website is accessed;
the server is also used for receiving and storing the first session ID sent by the second terminal equipment, and monitoring the user's access behavior based on the first session ID;
wherein the system comprising a third party programmed interface:
the first terminal equipment is also used for sending the first session ID and the URL of the target landing page to the third party programmed interface;
the third party programmed interface for receiving the first session ID and the URL of the target landing page sent by the first terminal equipment, using the first session ID and the URL of the target landing page as a parameter to generate a QR code, and sending the QR code to the first terminal equipment;
acquiring the first session ID and the URL of the target landing page by the second terminal equipment comprises: scanning a QR code in the first terminal equipment by the second terminal equipment to acquire the first session ID and the URL of the target landing page, the QR code comprises the information about the first session ID and the URL of the target landing page.

16. The system of claim 15, characterized in that the system comprising a third party programmed interface:
the first terminal equipment is also used for sending the first session ID and the URL of the target landing page to the third party programmed interface;
the third party programmed interface for receiving the first session ID and the URL of the target landing page sent by the first terminal equipment, using the first session ID and the URL of the target landing page as a parameter to generate a QR code, and sending the QR code to the first terminal equipment.

* * * * *